United States Patent [19]
Andersson

[11] Patent Number: 5,277,404
[45] Date of Patent: Jan. 11, 1994

[54] VALVE ASSEMBLY

[75] Inventor: C. Steven Andersson, W. Boylston, Mass.

[73] Assignee: Neles-Jamesbury Oy, Helsinki, Finland

[21] Appl. No.: 49,603

[22] Filed: Apr. 20, 1993

Related U.S. Application Data

[63] Continuation of Ser. No. 858,026, Mar. 26, 1992, abandoned.

[30] Foreign Application Priority Data

Mar. 27, 1991 [FI] Finland ................................. 911493

[51] Int. Cl.$^5$ ................................................ F16K 5/06
[52] U.S. Cl. ........................................ 251/315; 251/84
[58] Field of Search ............................. 251/84, 86, 315

[56] References Cited

U.S. PATENT DOCUMENTS

| | | | |
|---|---|---|---|
| 3,472,270 | 10/1969 | Mashedy | 251/315 X |
| 3,589,675 | 11/1969 | Scaramucci. | |
| 3,677,283 | 7/1972 | Tito | 251/315 X |
| 3,722,545 | 3/1973 | Furlani. | |
| 3,821,984 | 7/1974 | Lee | 251/315 X |
| 3,960,177 | 6/1976 | Baumann. | |
| 4,118,008 | 10/1978 | Myers. | |
| 4,165,580 | 11/1979 | Kalbfleisch. | |
| 4,175,580 | 11/1979 | Kalbfleisch. | |
| 4,293,163 | 10/1981 | Braddick | 251/315 X |
| 4,475,712 | 10/1984 | DeJager | 251/86 X |
| 4,480,813 | 11/1984 | Holly | 251/315 X |

FOREIGN PATENT DOCUMENTS

| | | |
|---|---|---|
| 0037322 | 3/1981 | European Pat. Off.. |
| 0376502 | 7/1990 | European Pat. Off.. |
| 2332151 | 1/1975 | Fed. Rep. of Germany. |
| 3812539 | 10/1989 | Fed. Rep. of Germany. |
| 1461040 | 10/1966 | France. |
| 2233540 | 1/1975 | France. |
| 407010 | 8/1934 | United Kingdom. |
| 2180626 | 4/1987 | United Kingdom. |

OTHER PUBLICATIONS

Patent Abstracts of Japan, vol. 14, No. 203 (M-096) Apr. 25, 1990 & JP-A-2 042 281 (Kitazawa Valve KK) Feb. 13, 1990.

Primary Examiner—John C. Fox
Attorney, Agent, or Firm—Cushman, Darby & Cushman

[57] ABSTRACT

A valve comprised of a valve body (1) incorporating a flow bore (2), of a check element (3) rotatably or pivotally adapted to said flow bore, said check element having the shape of rotational body or part of it, incorporating a flow port (4) and being supported by seat seals (5, 6), and of a driving stem (7). The stem is connected to the check element by means of a driver element (8) which is adapted to movably fit in a slot machined to the outside surface of the check element, said slot being aligned orthogonal to the longitudinal axis of the flow port of the check element. The driver element (8) is detachably joined to the stem (7). The end of the stem is adapted to a toothed, keyed or splined hole (12, 13) of the driver element (8) so as to render the joint a torque-transmitting capability.

6 Claims, 3 Drawing Sheets

VALVE ASSEMBLY

This is a continuation of application Ser. No. 07/858,026, filed on Mar. 26, 1992, now abandoned.

BACKGROUND OF THE INVENTION

1. Field of the Invention

The present invention relates to a valve comprised of a valve body incorporating a flow bore, of a closure element rotatably or pivotally adapted to said flow bore, said check element having the shape of a rotational body or part of one, incorporating flow ports and being supported by seat seals, and of a driving stem connected to said check element, whereby the stem is connected to the closure element by means of a driver element which is adapted to movably fit in a slot machined to the outside surface of the closure element, said slot being aligned orthogonal to the longitudinal axis of the flow port of the closure element. The valve is suited for checking or regulating the flow of a medium in a pipeline.

2. Description of the Related Art

The salient flow, regulating and checking characteristics of the ball valve are known in the art. Therefore, the use of this valve type is widespread and it is available in several different constructional embodiments. Ball valves developed for checking applications in particular conventionally have such a design in which the ball and the driving stem are fabricated as separate elements and in which the ball element is rotatably supported by means of seat seals adapted to the inlet and outlet sides of the valve body bore. The operating torque from the driving stem to the ball element is transmitted by a prismatic body, which is an integral part of the stem and has a cubic or rectangular shape to fit in a slot provided on the surface of the ball element, whereby the slot has matching dimensions and a straight or curved bottom. The play of the joint between the ball element and the stem is sufficiently large to allow unobstructed motion of the ball to enable pressure-assisted sealing of the valve, however, without sacrificing the torque-transmitting capability of the joint. The sealing force is created by the pressure differential prevailing between the valve ports, and consequently, when the ball element is rotated to the closed position the pressure pushes it against the seat seal.

The sides of the slot on the ball element surface are aligned orthogonal to the longitudinal axis of the flow port of the ball element, thus making the sides of the slot to be parallel with longitudinal axis of the flow bore of the valve in the closed position of the valve. In this fashion the closure element can move with respect to the stem end to rest against the seal. The bottom of the slot can also be curved in the direction of the slot's longitudinal axis.

The above-described joint between the ball element and the stem has been developed further by adapting a driver disc between the ball element and the stem having the purpose of aiding the motion of the ball element between the seat seals. The lower surface of the disc is provided with a straight ridge having a length equal to the disc diameter in a direction perpendicular to the longitudinal axis of the flow port of the ball element and the upper surface of the disc is correspondingly provided with a straight slot aligned orthogonally to the above-described ridge. The ridge of the lower surface is adapted to fit in the slot on the ball surface and a ridge formed to the end of the stem is adapted to fit in the slot of the disc's upper surface. As to its other functions, the valve corresponds to the sealing function of the first described embodiment of the stem joint, whereby the sealing force is also in this embodiment exerted by the pressure differential over the closed valve.

A further constructional embodiment used in ball valves is such in that the ball element surface has an internally splined hole into which a splined stem is fitted. The valve design may have one or two shafts supporting the ball, but the two-shaft type is more common. In the two-shaft construction the lower trunnion shaft below the ball element retains the ball centered relative to the driving shaft during operation of the valve, and the sealing function is provided by the pressure compressing the ball element against the seat seals. The function of the one-shaft valve corresponds to that of the above-described valves.

A typical stem-and-ball system designed for pressure-assisted sealing is disclosed in the U.S. Pat. No. 3,843,091 (Gachot, Oct. 22, 1974).

The U.S. Pat. No. 3,767,162 (Ohlsson, Oct. 23, 1973) concerns an invention related to the joint between the stem and the ball element.

The U.S. Pat. No. 4,342,330 (Wieveg et al., Aug. 8, 1982) discloses a design in which the joint between the ball element and the stem is implemented using a driver disc between the ball element and the stem.

The FI patent publication 79,253 (Kivipelto, Aug. 8, 1989) concerns an invention related to a one-shaft ball valve and employing a spline joint between the ball element and the shaft that transmits the operating torque.

Reliable function of the valve with a varying temperature of the flowing medium requires flexibility or play between the ball element and the seat seal in order to prevent the ball from jamming between the seals. When resilient seat seals made of plastic, for instance, are used, compensation of thermal expansion can be attained through elasticity of the seat seals. If the seat seals are made of a metallic material, a clearance is provided between the ball element and the seat seals so large that compressive contact of the ball element with both seat seals simultaneously is avoided.

During the rotation of the ball element to its closed position, its center point must shift in the direction of the flow so far from the center axis of the stem as required to eliminate the total play or half the elastic travel. The shift is necessary to achieve tightness of the valve. At the opening of the valve, the ball must correspondingly shift back by a corresponding distance toward the center axis of the stem under the thrust generated by the seat seal.

In conventional joints between the ball element and the stem, a problem is caused by the play in the joint between the stem and the ball element that is necessary for enabling the shift of the ball. During use the joint wears and its play increases in proportion to the operating cycles of the value, eventually resulting in annoying operating disturbance to the user. The increase of the play is accentuated by a high pressure difference imposed over the ball element. Wear is caused by the above-described reciprocating motion of the stem end in the slot of the ball surface during the operation of the valve.

This wear is especially severe in a valve with a metal seal. In such a valve the friction between the ball element and the seal is greater than in a valve with a resilient seal and the operating torque of the valve is higher. The higher torque in turn results in an increased pressure in the contacting areas of the stem joint with the ball, which further increases the frictional forces and hampers the return motion of the ball toward the center axis of the stem. This problem is avoided by virtue of the present invention. In prior-art methods the problem could have been overcome by using a ball element with two shafts, but such a construction is difficult to produce, expensive and prone to malfunction in comparison with the design offered by the present invention. The two-shaft construction necessitates the use of a movable seat seal which is compressed against the ball element by means of springs, for other mechanical or hydraulic elements in order to exert the sealing force.

The reciprocating motion of the ball causes wear and a subsequent increase of play in the joint between the ball and the stem, which in prior art has been simply circumvented through the adaptation of a driver disc in the above-described manner between the stem end and the ball, whereby the disc has a ridge and a slot for transmitting the operating torque from the stem to the ball element. This embodiment, however, must be provided with a clearance in the fits of the ridge and the slot on the opposite sides of the disc in order to attain a functioning pressure-assisted sealing effect, whereby the rotational play of the valve remains large and torque-transmitting capability of the stem minimal.

The embodiment based on the use of a driver disc removes the problem caused by the increase of play due to wear, but notwithstanding this, the play remains larger than that offered by the present invention because of the initial play necessary in such a construction. The slotted joints on the upper and lower surfaces of the disc must have play to allow the motion of the ball element even under a small pressure difference toward the direction of the flow when the valve is rotated closed. Correspondingly, the ball element must move easily back toward the center axis of the stem when the valve is opened. Moreover, when a slotted joint is used, the torque-transmitting capability of the joint remains inferior to a spline joint. To achieve a high torque-transmitting capability, the internal and external splines would have to be relatively high, which in its turn would necessitate a large diameter of one end of the stem. Herein, a problem arises in that the sealing area of the ball element is reduced and that a stem extended longer than normal cannot be adapted to the body without modification of the body structure. Reduction of the ball element area available for sealing necessitates the use of a larger-diameter ball element and possibly also increasing the size of the valve body. Consequently, the use of a larger-diameter stem may become very awkward. The use of an extended-length stem is necessary to maintain an appropriate operating temperature of the valve actuator and the stem seal when the medium flowing through the valve is extremely cold or hot, or in cases where, e.g., the stem seal must be modified for a drain tap necessary to collect a toxic medium. Of course, a similar adaptation problem is encountered when a driver element machined from the same blank with the stem is used.

The wear problem can also be overcome by using a ball element having a internally splined hole to accept the splined stem that rotates the ball element. Also such a design is incapable of achieving a ball element which is easily rotatable and can travel a large degree in the direction of the flow without resorting to the use of substantial play of the spline joint.

A large play in the joint between the ball element and the stem prevents the use of the valve as a regulating valve in most applications. Play in the operating control may also cause problems in closure valve use, because uncertainty in the positioning of the ball element to the optimally sealing position of the ball results in inferior check performance of the valve. These problems related to zero-play transmitting of the operating torque and increase of the operating play are overcome by virtue of the present iuvention.

SUMMARY OF THE INVENTION

It is an object of the present invention to achieve a simple construction of a valve suited both for checking and regulating purposes, in which valve an effective pressure-assisted sealing effect is attained and in which valve the operating torque necessary for moving the closure element is transmitted with as close to zero play as possible from the operating control to the closure element. A further object of the invention is to achieve a valve which can be operated even at an appreciably high operating torque and frequency without subsequent increase of operating play. Another further object of the invention is to achieve a valve which can be modified for different applications by virtue of interchangeably replaceable elements.

To attain the above-disclosed goals, the invention is principally characterized by what is stated in claim 1.

In the design disclosed in the present invention, the valve body need not be modified by any means through, e.g., machining of additional space to adapt a larger-diameter stem in the ball chamber, and consequently, the splitting plane of the valve body requires no redesign. Also the difficulties associated with the extension of the stem with another stem element can be avoided, because the extension stem is not necessarily needed at all; instead, a longer stem can be fitted. Because the extension stem is disposed, of it is easy to adapt in the valve body, a pressure-proof joint of a tubular protective element, which is required for outdistancing the seal of a long stem sufficiently far from the valve body. The omission of the extension stem allows a smaller-diameter tubular protective element to be used. Otherwise, the extension joint of the stem must have a diameter larger than that of the mere stem, thus necessitating the use of a larger-diameter tubular protective element.

To assure a low-friction float of the joint between the ball element and the splined stem, sufficient play must be provided, since the float of the ball element is permitted only by the play designed into the spline joint, not by the tilting of the driver element or its motion in a slot on the surface of the ball element as is the case in the design according the present invention. Similarly, by virtue of the driver element, the valve can be designed to have a larger clearance at its seals; in other words, the free travel of the ball element in the ball chamber becomes longer in direction of the flow. This is mandatory for applications in which the medium flowing through the valve is hot. To prevent the valve from jamming in such use, sufficient allowance must be made for the thermal expansion of the ball element, since the flowing medium heats the ball element to a higher temperature than the valve body and at a faster rate, in particular when the operating environment of the valve is not warm. Furthermore, it is customary to make the ball elementof acid-roof steel, while the valve body is of carbon steel. Due to the higher value of thermal expansion coefficient of stainless steel with respect to that of carbon steel, the jamming hazard of the valve is imminent unless a large degree of play of the ball element in the direction of the flow in the pipeline is provided.

The use of a separate driver element offers the combined benefits of a splined stem and a stem inserted from the inside of the valve body in a floating ball valve, yet achieving an easy assembly of the valve. The advantages of the splined stem are its high torque-transmitting capability and high resistance to wear. On the other hand, a stem inserted from the inside of the valve body offers the possibility of preventing the stem from being ejected from the pressurized valve body simply through the use of collar on the stem, while simultaneously the access to the stem seals becomes easy, which is advantageous in terms of maintenance.

BRIEF DESCRIPTION OF THE DRAWINGS

In the following the invention and its details are described with reference to the enclosed drawings, in which.

DETAILED DESCRIPTIONS OF THE PREFERRED EMBODIMENTS

Figure 1:
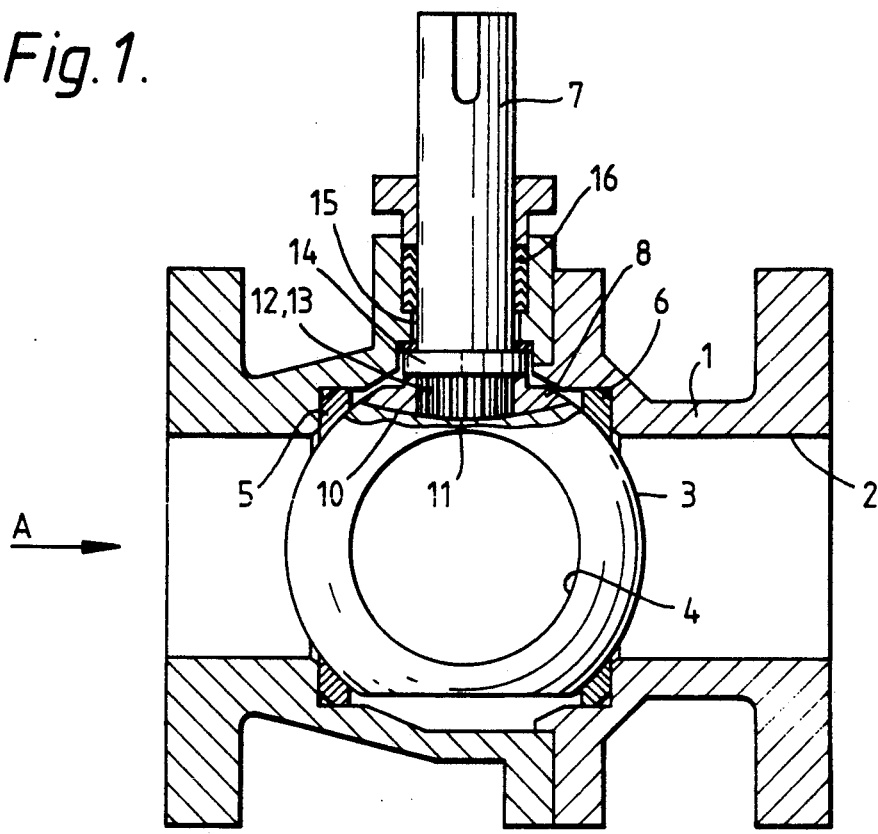
FIG. 1 shows a ball valve in the closed position in a side view shown perpendicularly to a pipeline and sectioned longitudinally along the midplane of the pipeline.
Figure 2:
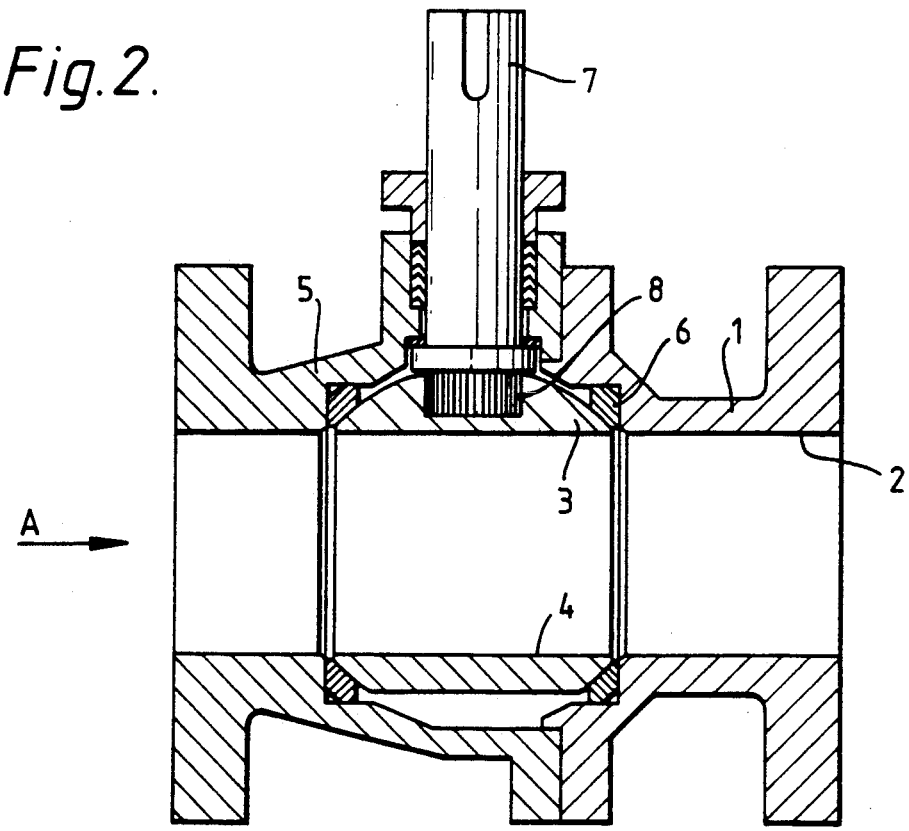
FIG. 2 shows the valve in the open position in the same sectional view, FIGS. 3a ... 3c show the driver element viewed in the same direction as in FIG. 1 partially sectioned, in a top view and shown in the same direction as in FIG. 2.
Figure 3C:
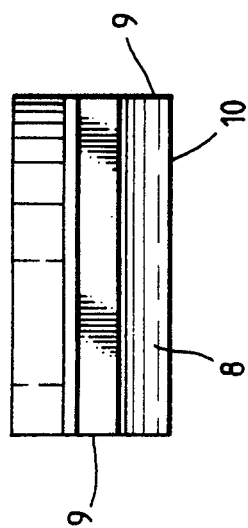

FIGS. 1 and 2 show a bal a valve comprising a valve body 1 and a flow bore 2. Adapted in the flow bore is a ball-shaped closure element 3 having a flow port 4. The closure element is supported in the flow bore by means of annular seat seals 5 and 6. The ball element is rotated in the chamber of the valve body by means of a stem 7.

Figure 3A:
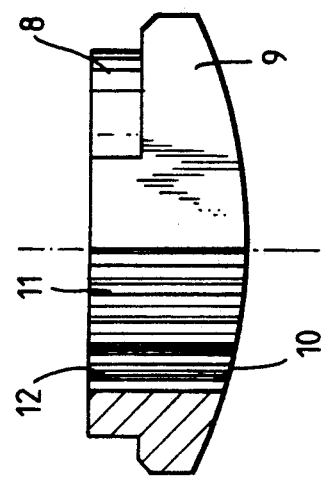
Figure 3B:
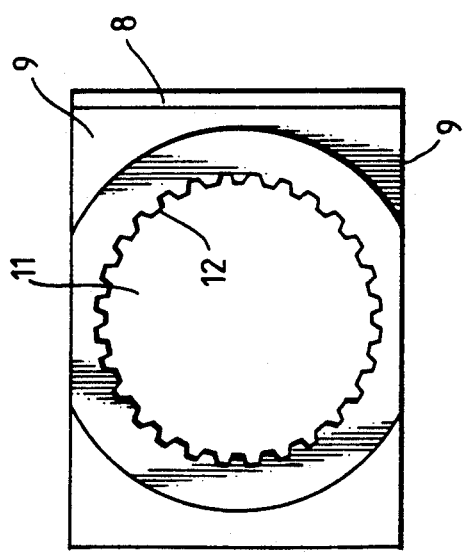

The outside surface of the check element 3 has a slot-like recess into which a driver element 8 at the end of the stem 7 is fitted. An example of the design of the driver element is shown in FIGS. 3a ... 3c. The sides of the slot and corresponding sides 9 of the driver element are aligned perpendicular to the longitudinal axis of the flow port 4 of the closure element. Furthermore, the bottom of the slot and correspondingly the bottom side 10 of the driver element are curved in the direction of the longitudinal axis of the slot. This arrangement permits both the motion of the driver element with respect to the closure element both longitudinally along the slot as well as through tilting along the curved bottom of the slot.

Figure 4:
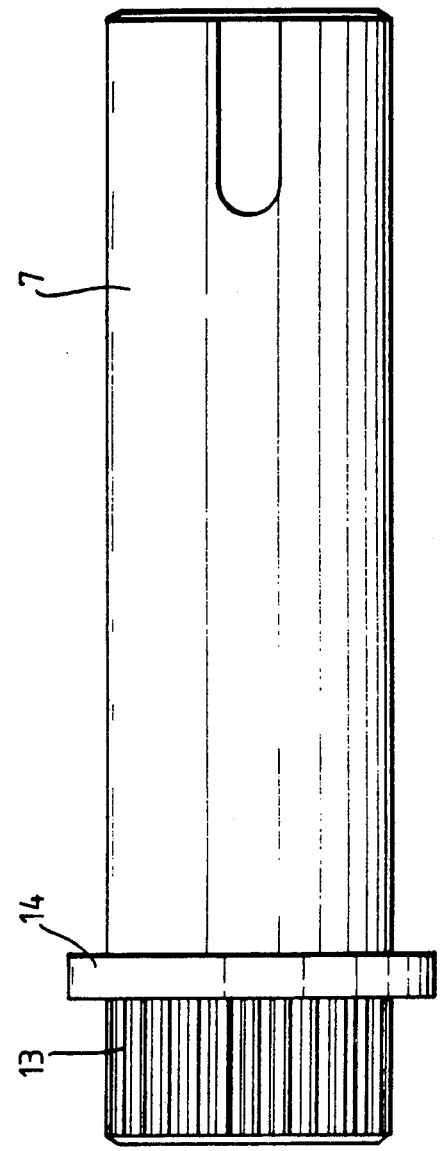
FIG. 4 shows the stem in a side view.

The driver element has a hole 11 which is internally provided with splines 12 having straight sides aligned parallel with the center axis of the hole. FIG. 4 shows a separate stem which has matching splines 13 at its end. The driver element and the stem are connected by inserting the stem in the hole of the driver element. The upper surface of the driver element rests against the lower surface of the stem collar 14. The upper surface of the collar 14 is adapted to rest against the lower surface of the valve chamber collar 15. A stem seal 16 is inserted between the stem and valve chamber collars.

The splines 12 of driver element and the splines 13 of the stem are dimensioned so that the driver element can slide in the direction of the stem's center axis with a slight tilting capability with respect to the stem axis. Rotational play between these elements is minimal. If necessary, additional tilting capability with respect to the axis of the hole can be arranged through appropriate curvedness of the mating surfaces.

Figure 5:
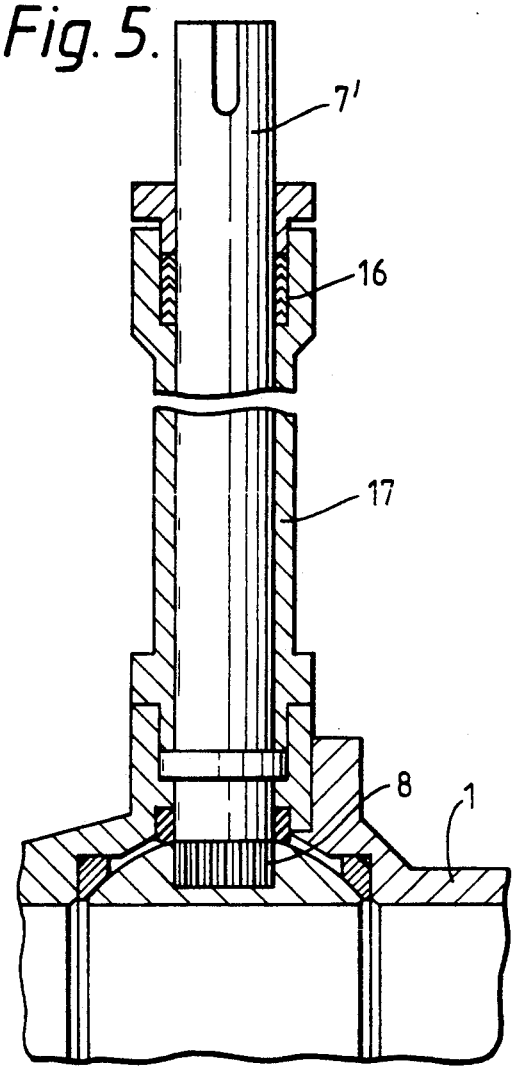
FIGS. 5 and 6 show exemplifying embodiments of the same valve modified into special version by way of replacing appropriate interchangeable elements.

FIG. 5 shows a version of the valve modified for a cryogenic medium by way of replacing appropriate interchangeable elements. The original stem is replaced by a longer stem 17', over which is adapted a tubular protective element 17 that is attached to the splitting plane of a standard-design valve body and has at its upper end a space for a stem seal 16.

Figure 6:
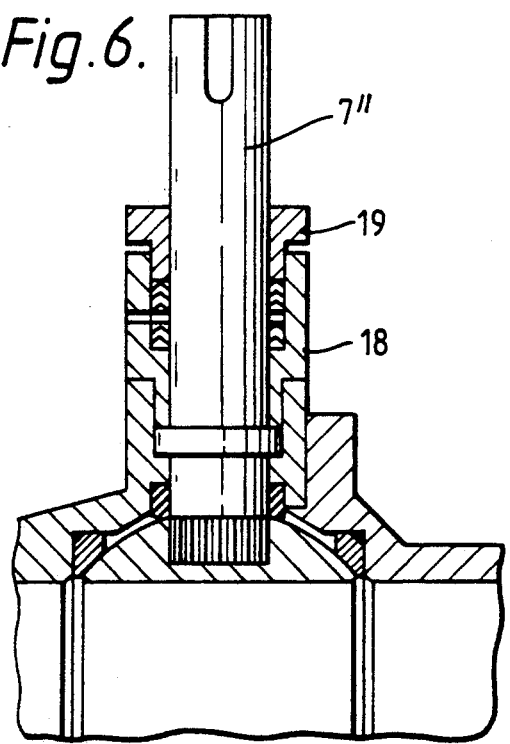

FIG. 6 shows a version of the valve modified for an environmentally hazardous medium by way of replacing appropriate interchangeable elements. The original stem is replaced by a longer stem 17", and the bushing 18 of the stem seal And the gland nut 19 of the stem seal are replaced by special types suited for this application. The tubular protective element of the stem with a drain tap 17 is attached to the splitting plane of a standard-design valve body in the same manner as the tubular protective element 17 in FIG. 5.

FIG. 1 illustrates the joint between the stem 7, the driver element 8 and the closure element 3. The diagram also shows the valve body 1, the seat seal 6 against which the closure element rests and direction A of the flow in the pipeline. The valve is shown in the closed position and the pressure difference has pushed the closure element 3 against the outlet side seat seal 6. The lateral shift of the closure element 3 is made possible by elastic motion of the driver element 8, a slight tilting of the driver element, tilting in the joint of the stem 12, 13 and a short sliding shift taking place in the slotted recess in the direction of the slotted recess. Because the floating of the closure element 3 is based on the combined effect of the above-described motions, no play between the driver element and the closure element is needed as would be necessary in a design operating without a separate driver element or in a design utilizing a driver disc in the joint. By contrast, the play of the spline joint 12, 13 in a separate driver element with a hole, in particular the rotational play can be made very small, whereby the total play of the design, when the joint between the closure element and the driver element has zero play, becomes extremely small in comparison with conventional designs. Despite the almost zero-play construction, the closure element 3 floats unobstructed, centers well against the seat seal 6 and has large allowance for thermal expansion. Good floating capability and tightness are achieved already at a small pressure difference exerted over the closure element. Without the use of the separate driver element with a hole, the zero-play function of the joint between the closure element and the stem would be impossible without compromising the floating capability of the closure element or its shifting allowance.

In FIG. 2 the stem 7 is shown rotated from the position illustrated in FIG. 1, and the stem has rotated the driver element 8, and thereby, the closure element 3. The flow port 4 of the closure element has been rotated parallel with the pipeline 2, and the closure element remains floating guided by the surfaces of the seat seals 5, 6.

In this embodiment of the invention, the joint between the stem 7 and the driver element is straight-side spline joint 12, 13. An alternative design according to the invention has the splines 13 of the stem machined curved or spherical at their tit)S, whereby the floating capability of the closure element as well as its rotation can be further enhanced. Then, the sides of the splines are curved in sections taken along the axis of the hole, thus permitting the inclination of the stem with respect to the driver element.

The invention offers a good torque-transmitting performance and low wear of the ides of the driver element 8 and the slot of the closure element. The low wear results from the minimal mutual motion between the closure element 3 and the driver element 8 required for moving the closure element against the seat seal 5, 6. The importance of this characteristic is accentuated in applications operating at high pressure differences and frequent actuation of the valve. The resistance to wear is further enhanced by the zero play of the driver element in the slotted recess and the large size of the element, whereby linear pressures encountered at the edges of the sides of the driver element cannot grow excessively high. In conventional joints between the ball element and the stem, the driver element is generally machined to the stem end from the same blank as the stem, whereby the length of the driver element portion cannot be made sufficiently long, and therefore, a lower torque-transmitting capability and higher wear than in the design according to the present invention results.

Besides ball valves, the present invention is suited for use in conjunction with other types of valves having a closure element shaped as a rotational body or part of rotational body, which may be different from a ball.

I claim:

1. A valve assembly comprising:
   a valve body;
   a flow bore incorporated in said valve body;
   a closure element, said closure element being rotatably mounted in said flow bore and having an outside surface thereof;
   a flow port incorporated in said closure element and having a longitudinal axis;
   a slot incorporated in said outside surface of said closure element, said slot being orthogonal to the said longitudinal axis of said flow port of said closure element and having a longitudinal axis;
   a plurality of seat seals supporting said closure element within said flow bore;
   a driver element having a first and a second side, said first side of said driver element being adapted to movably fit in said slot;
   a stem having a first end and a longitudinal axis, said first end of said stem having a plurality of mating surfaces; and
   an aperture incorporated in said second side of said driver element, said aperture having means for reducing relative play between said stem and said driver element, said means for reducing relative play comprising a plurality of mating surfaces for mating with said mating surfaces of said stem;
   wherein said stem is fitted into a said aperture so as to provide a torque transmitting capability between said stem and said closure element through said driver element, and said first end of said stem being detachable from said hole; and
   wherein said plurality of mating surfaces on said first end of said stem and said plurality of mating surfaces on said means for reducing relative play being one of toothed and splined.

2. A valve assembly as claimed in claim 1, wherein said driver element and said first end of said stem are fitted so as to permit a tilting motion of said driver element relative to said longitudinal axis of said stem.

3. A valve assembly as claimed in claim 2, wherein said slot has a bottom portion, said bottom portion being curved in a direction of the longitudinal axis of said slot, and said first side of said driver element being curved in a direction of the longitudinal axis of said slot so as to permit said driver element to tilt relative to said closure element along said slot.

4. A valve assembly as claimed in claim 1, wherein said driver element and first end of said stem are fitted so as to permit a motion of said driver element in a direction of said longitudinal axis of said stem.

5. A valve assembly as claimed in claim 1, further comprising:
   a collar on said stem having a first and second surface, said first surface of said collar contacting said second side of said driver element;
   a valve chamber collar having a first surface, said first surface of said valve chamber collar contacting said second surface of said stem collar; and
   a stem seal being located between said stem and said valve chamber collar.

6. A valve assembly as claimed in claim 1, wherein said plurality of mating surfaces of said first end of said stem and said plurality of mating surfaces of said means for reducing relative play are curved.

* * * * *